(12) United States Patent
Lombriser et al.

(10) Patent No.: US 8,610,011 B2
(45) Date of Patent: Dec. 17, 2013

(54) BELT LOCK WITH A SWITCH ARRANGEMENT FOR DETECTION OF THE LOCKING STATUS

(75) Inventors: Clau Lombriser, Trun (CH); Carsten Kaebisch, Chur (CH)

(73) Assignee: Polycontact AG, Chur (CH)

( * ) Notice: Subject to any disclaimer, the term of this patent is extended or adjusted under 35 U.S.C. 154(b) by 283 days.

(21) Appl. No.: 12/912,862

(22) Filed: Oct. 27, 2010

(65) Prior Publication Data

US 2011/0094067 A1 Apr. 28, 2011

(30) Foreign Application Priority Data

Oct. 27, 2009 (CH) ..................................... 1644/09

(51) Int. Cl.
*A44B 11/26* (2006.01)
*H01H 9/00* (2006.01)

(52) U.S. Cl.
USPC ........... 200/61.58 B; 24/642; 24/641; 24/633; 340/457.1

(58) Field of Classification Search
None
See application file for complete search history.

(56) References Cited

U.S. PATENT DOCUMENTS

| 5,742,986 | A | 4/1998 | Corrion et al. |
| 5,966,784 | A * | 10/1999 | Arbogast et al. ................ 24/633 |
| 6,266,855 | B1 | 7/2001 | Specht et al. |
| 7,084,362 | B2 * | 8/2006 | Ebert .................... 200/61.58 B |

FOREIGN PATENT DOCUMENTS

| EP | 0 861 763 A2 | 9/1998 |
| EP | 1 025 774 A2 | 1/2000 |
| ER | 1 585 276 A1 | 10/2005 |

* cited by examiner

*Primary Examiner* — Jack W. Lavinder
(74) *Attorney, Agent, or Firm* — Buchanan Ingersoll & Rooney PC

(57) ABSTRACT

A belt lock for a seat belt system includes a locking mechanism arranged in a belt lock housing formed from two housing shells for an inserted belt tongue. The locking mechanism has an axially movable component that changes its location from a first end position into a second end position when the locking mechanism is actuated. The locking mechanism is also equipped with a switch arrangement that has at least one fixed contact part and one switching contact part that can move relative to it and on which, in an end position of the component that changes its location, the component acts. The switching contact part is configured as a clamp-shaped elastic sheet part with two axially running side braces that are provided with knee-like bends that, in an end position of the axially movable component, are mechanically exposed to pressure by the component.

11 Claims, 3 Drawing Sheets

BELT LOCK WITH A SWITCH ARRANGEMENT FOR DETECTION OF THE LOCKING STATUS

RELATED APPLICATION

This application claims priority under 35 U.S.C. §119 to Swiss Patent Application No. 1644/09 filed in Switzerland on Oct. 27, 2009, the entire content of which is hereby incorporated by reference in its entirety.

FIELD

The present disclosure relates to a belt lock with a switch arrangement for detection of the locking status, such as the detection of the locking status of a seat belt system in an automobile, for example.

BACKGROUND INFORMATION

In technical applications, such as in an automobile construction and the like, for example, it is desirable to quickly and reliably detect the location of a component that can be moved into two end positions relative to a stationary part, using measurement technology. In retaining systems of automobiles, for example, it is desirable to check, for example, whether or not a passenger is belted. For this purpose, proper locking of the tongue of the seat belt that has been inserted into the belt lock is checked. Knowledge of the locking status of the belt lock allows for the passengers to be notified by a signal to put on and fasten their seat belts. Since the introduction of safety airbags, information about the locking status of seat belt systems has also been important for activating or deactivating mechanisms for inflating driver and passenger airbags or side and head airbags.

For example, Hall sensors are known for contactless monitoring of components that change their location and especially can occupy two different end positions. Hall sensors can include a semiconductor layer supplied with a constant current, in an integrated design. A magnetic field component perpendicular to the semiconductor layer influences the constant current, and the sensor delivers a Hall voltage that can be evaluated, that can be tapped and used to evaluate a status, or that can also be used directly as a switching voltage. The integrated design of Hall sensors makes it possible to integrate an evaluation circuit that is suitable for evaluation of the switching state on the Hall sensor. In the automotive industry, therefore, Hall sensors are used as contactless status sensors in many applications.

EP-A-0 861 763 discloses, for example, a belt lock with an integrated, pretensioned Hall sensor that, without contact, detects the state of a locking body or an ejector for a lock tongue that has been inserted into the belt lock. A Hall sensor with a Hall field is arranged in direct proximity to a permanent magnet. Changing the location of the locking body and of the ejector, which are composed of a ferromagnetic material for this purpose, changes the magnetic field of the permanent magnet. In doing so, the signal of the Hall sensor changes and at the output of the Hall sensor, the status change can be tapped as a voltage change. In one alternative variant, it is suggested that the Hall sensor with a Hall field can be installed without a permanent magnet, and the locking body or the ejector can be designed as a permanent magnet for this purpose. In this arrangement, the change in the location of the locking body or of the ejector will also be detectable by a change of the Hall voltage.

However, in the belt lock according to EP-A-0 861 763, the Hall sensor must be positioned very carefully with reference to the locking element or the ejector. Subsequent installation of the Hall sensor can therefore be relatively complex and expensive. Depending on its arrangement, the Hall sensor can also be sensitive to external stray electromagnetic fields that can be caused by, for example, a magnetic key ring. Optionally, even additional shielding may have to be mounted, which complicates the structure or installation. The susceptibility to external stray fields is also increased by the signal changes being relatively small due to the relatively short paths that must be traversed by the locking body or the ejector when the seat belt lock is locked or unlocked. The seat belt variant without a pretensioned Hall sensor, in which either the locking body or the ejector is designed as a permanent magnet, is less practicable. The attainable signal changes are also relatively small here, which makes it difficult to detect different states, such as whether the belt lock is locked or unlocked. Vibrations of the locking body and of the ejector during locking and unlocking of the seat belt can cause demagnetization of the permanent magnet with time. This can ultimately lead to the Hall sensor becoming ineffective and the status changes of the belt lock no longer being able to be reliably detected.

The known belt locks have a very compact design that therefore limits the available space within the belt lock. This makes it difficult to arrange sensor components within the belt lock housing, especially in the vicinity of a component that changes its location from one end position into the other end position when the belt lock is actuated. If shields are then also to be attached, the engineer is generally faced with an essentially insoluble problem since the dimensions of the belt lock housing are not to be changed.

EP-B-1 485 276 discloses a belt lock in which the locking status is by a switch that can be actuated mechanically. The switch includes a fixed contact sheet and a contact sheet that is designed as a spring contact and that projects into the displacement path of a slide that can be moved into two end positions. During locking, the slide presses against a middle bent region of the spring contact, by which a hammer-shaped contact end comes into contact with the fixed contact sheet. However, this known belt lock switch is susceptible to failures. For example, if the spring contact is made too solid, it can disturb the displacement motion of the slide, and by blocking the slide in a middle position, it can even lead to malfunction of the belt lock. If, conversely, the spring contact is made so thin that its inherent spring force cannot impede the slide in any case, it tends to rattle during operation of the automobile. There is also a certain danger that the middle bent region of the spring contact will deform with time. This can lead to the hammer-shaped contact end no longer coming into contact with the fixed contact sheet and in this way the locking status of the seat belt is no longer detected and/or indicated. In the worst case, the spring contact even breaks due to continuous vibrations, which can likewise lead to the locking status of the belt lock no longer being able to be detected.

SUMMARY

An exemplary embodiment provides a belt lock for a seat belt system. The exemplary belt lock includes a belt lock housing formed from two housing shells. The exemplary belt lock also includes a locking mechanism configured to be actuated and being arranged in the belt lock housing for an insertable belt tongue having an axially movable component whose location is changeable from a first end position into a second end position when the locking mechanism is actuated.

The locking mechanism includes a switch arrangement that has at least one fixed contact part and one switching contact part configured to move relative to the at least fixed contact part and on which, in an end position of the component that changes its location, the component acts. The switching contact part is arranged as a clamp-shaped spring sheet with two axially running side braces, a cross brace, and at least two knee-like bends that, in an end position of the axially movable component, are configured to be mechanically exposed to pressure by the component.

BRIEF DESCRIPTION OF THE DRAWINGS

Additional refinements, advantages and features of the present disclosure are described in more detail below with reference to exemplary embodiments illustrated in the drawings. It is to be understood that the drawings are not to scale. In the drawings.

DETAILED DESCRIPTION

Figure 1:
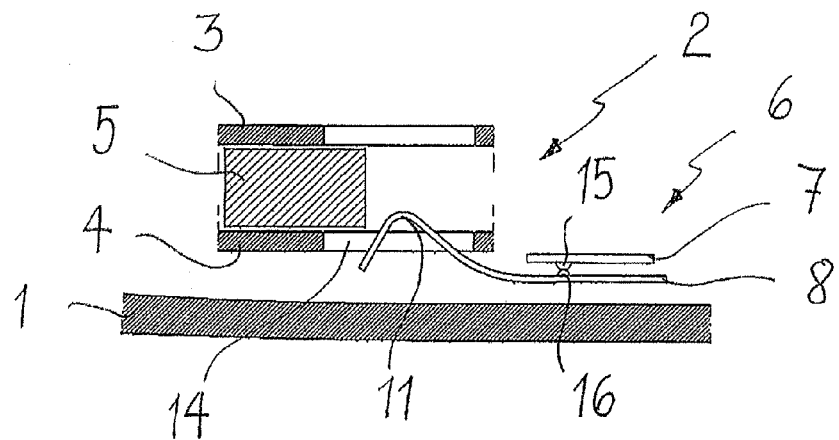
FIG. 1 shows a schematic diagram of an exemplary switch arrangement that interacts with an axially movable component, according to an embodiment of the present disclosure.

Exemplary embodiments of the present disclosure provide a belt lock whose locking status can be easily and reliably ascertained. According to an exemplary embodiment, the belt lock is insensitive to stray and disruptive magnetic fields. The belt lock is configured to detect the locking status and is configured to be durable and not adversely affect the operation of the belt lock. The belt lock can be configured to permit the size of the belt lock housing to be kept unchanged. Simple and economical installation will be made possible.

Exemplary embodiments of the present disclosure provide a belt lock for a seat belt system that includes a locking mechanism for an inserted lock tongue that is arranged in a belt lock housing that is formed from two housing shells. The locking mechanism has an axially movable component that changes its location from a first end position into a second end position upon its actuation. Furthermore, the belt lock can be equipped with a switch arrangement that has at least one fixed contact part and a switching contact part that can move relative to the fixed contact part, and in an end position of the component that changes its location is acted upon by the latter. The switching contact part can be arranged as a clamp-shaped, elastic sheet part with two axially running side braces and a cross brace, and can have at least two knee-like bends that are subjected to pressure in an end position of the axially movable component by the latter.

In contrast to the relatively filigreed mechanical switch arrangement known from conventional designs, the switch contact sheet according to exemplary embodiments of the present disclosure can be arranged as a stable spring clamp sheet. The at least two knee-like bends ensure that the axially movable component cannot tilt upon interaction with the spring clamp sheet. If one of the knee-like bends should no longer be exposed to pressure by deformation in the end position of the axially movable component, the pressure on the second knee-like bend is enough to actuate the switch arrangement. In this way, there is greater safety for the detection of the axial displacement of the component. The switch arrangement has a simple structure and manages without a thrust bearing.

The knee-like bends can be provided on the cross brace or on the two side braces.

In accordance with an exemplary embodiment of the present disclosure, the axially movable component can include an ejector that can be moved within a frame bordered by an upper part and a lower part. The switch arrangement can be arranged in the immediate vicinity of the ejector, within the frame or on the frame. In this exemplary arrangement, the side braces of the spring clamp sheet have only relatively small knee-like bends since the clamp-like sheet is located in the immediate vicinity of the ejector. To prevent electrical short circuits and to suppress rattling noise, the switch arrangement can also be arranged in a separate housing.

In another exemplary embodiment of the belt lock, the axially movable component can include an ejector that can be moved within a frame that is delineated by an upper flattened part and a lower flattened part. In this exemplary embodiment, which is simpler in terms of installation technology, the switch arrangement can be integrated into a housing shell. Here, the knee-like bends project through recesses in the upper part and in the lower part of the frame into the axial displacement path of the ejector.

In another exemplary embodiment of the present disclosure, the housing shell in which the switch arrangement is housed can be a lower shell of the belt lock housing. The recesses for the knee-like bends are then located in the lower part of the frame. In this exemplary embodiment, the space already present anyway in the lower shell is used specifically to house the switch arrangement. The existing space is sufficient due to the especially flat design of the switch arrangement with only two interacting flat sheets. The arrangement of the flat sheets in the lower shell is also very simple in terms of installation technology and can be easily automated.

To further facilitate mounting of the switch arrangement, the lower shell can be equipped with a receiver for the fixed contact sheet and for the switching contact sheet. In this way, the fixed contact sheet and the switching contact sheet can be moved less easily during mounting.

To establish electrical contact, the fixed contact sheet can have at least two electrical contact regions that interact with the same number of switching contacts on the switching contact sheet. This exemplary arrangement ensures distinctly separable switching states.

Due to higher stiffness, the switching contacts can be located on the cross brace of the switching contact sheet that connects the two side braces.

According to an exemplary embodiment, the switch arrangement, when exposed to pressure by the axially movable component, e.g., by the ejector, can open or close a circuit. In one mechanically very simple layout, the switch arrangement can be designed as a normally closed (N/C) contact.

According to an exemplary embodiment, the belt lock can be utilized in generating an optical and/or acoustic warning signal for the passengers, for example of an automobile, to fasten their seat belts. Furthermore, the belt lock that is equipped according to exemplary embodiments of the present disclosure can also be used for the activation or deactivation of mechanisms for inflating airbags for the passengers of an automobile. For one skilled in the art, a host of further possible applications that would exceed the scope of this application if enumerated would be opened up.

FIG. 1 illustrates an exemplary embodiment according to the present disclosure. In FIG. 1, a belt lock housing of a belt lock, for example a lower shell, is indicated by reference number 1. A metal frame in and on which a locking mechanism of the belt lock is housed bears the reference number 2 as a whole. The metal frame 2 includes an upper part 3 that is made flat and a related lower part 4 that is made flat. The upper part and lower part 4 are tightly connected to one another, for example by riveting. The upper part 3 and the lower part 4 delineate a slit-like guide channel into which a belt tongue can be axially inserted. In the schematic diagram of FIG. 1, this takes place, for example, from the left. Here, an electrically nonconductive component 5, for example an ejector, which is arranged within the frame 2, is axially pushed against the return force of a spring.

A switch arrangement provided with the reference number 6 includes a fixed contact part 7 and a switching contact part 8. For example, the two contact parts 7, 8 can be designed as sheets. It is apparent from the schematic representation of FIG. 1 that the switching contact part 8 is provided with a knee-like bend 11 that projects through a recess 14 in the lower part 4 of the frame 2 into the displacement path of the ejector 5. In the axial displacement of the ejector 5 out of its first end position in the unlocked state into the second end position in the locked state of the belt lock, it crosses the knee-like bend 11 of the switching contact 8. In this way, the switching contact part 8 is exposed to pressure, and the interacting contacts 15, 16 on the fixed contact part 7 and on the switching contact part 8 of the switch arrangement 6 that is designed as an N/C contact are separated.

In the exploded representation of the components that are relevant to the detection of the locking status of the belt lock, the frame in or on which the locking mechanism for the belt tongue is housed in turn bears the reference number 2 as a whole. The upper part and the lower part are designated with reference numbers 3 and 4, respectively. The ejector that can be axially moved within the frame bears the reference number 5. An unlocking button is indicated as reference number 20. The switch arrangement is provided with the reference number 6 as a whole. The switch arrangement 6 includes a fixed contact sheet 7 with contacts 15 and a clamp-like elastic switching contact sheet 8. The elastic switching contact sheet 8 has a cross brace 9, with knee-like bends 11 or projections, that connects two side braces 10. On the cross brace 9, there are contacts whose number corresponds to the contacts 15 on the fixed contact sheet 7. Electrical contacting of the contact sheets 7, 8 takes place in each case on the lengthwise ends of the sheets facing away from the contacts.

Figure 2:
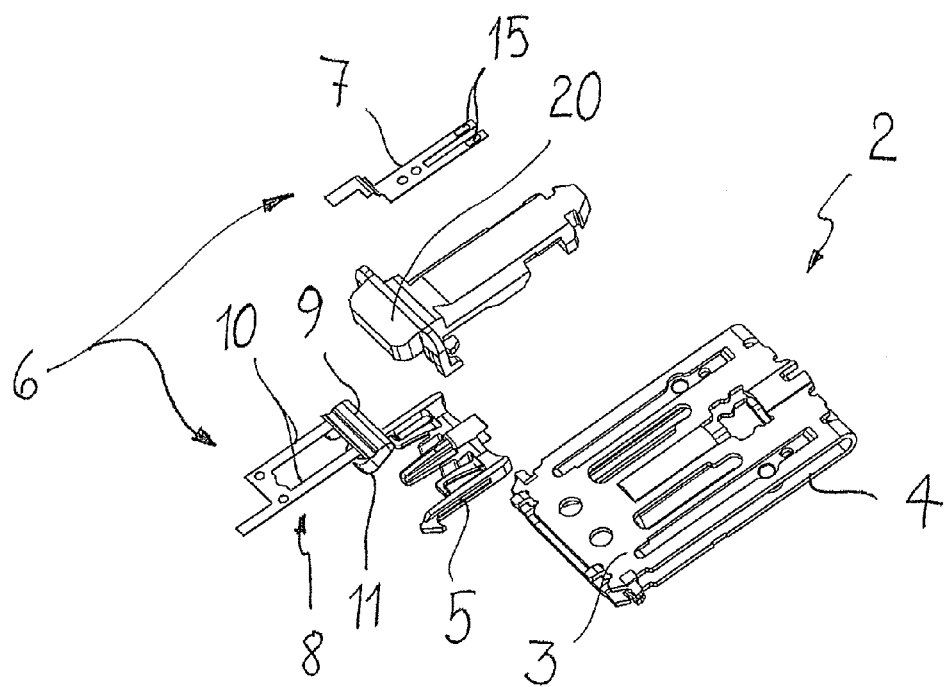
FIG. 2 shows a pulled-apart perspective representation of components of an exemplary belt lock that interact when the locking status is detected, according to an embodiment of the present disclosure.
Figure 3:
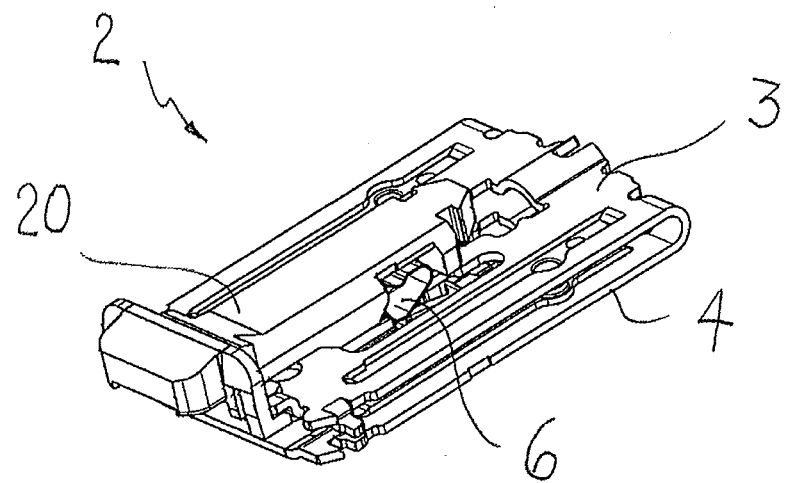
FIG. 3 shows a perspective view of the assembled components from FIG. 2.

FIG. 3 shows in assembled state the components that are shown pulled-apart in FIG. 2. The frame formed by the flat upper part 3 and the flat lower part 4 is in turn provided with the reference number 2 as a whole. The axially movable ejector is arranged within the guide channel surrounded by the frame 2. The switch arrangement is likewise arranged within the frame 2 in the immediate vicinity to the ejector and is indicated by reference number 6. The unlocking button 20 is arranged outside of the frame.

The locking mechanism includes further components, such as, for example, a locking body, one or more return springs, a locking element, etc., that, however, was eliminated for reasons of clarity. The fundamental design of a locking mechanism of a belt lock as it is used, for example, in this disclosure is known from, for example, EP-1 025 774, which is incorporated by reference in its entirety.

Figure 4:
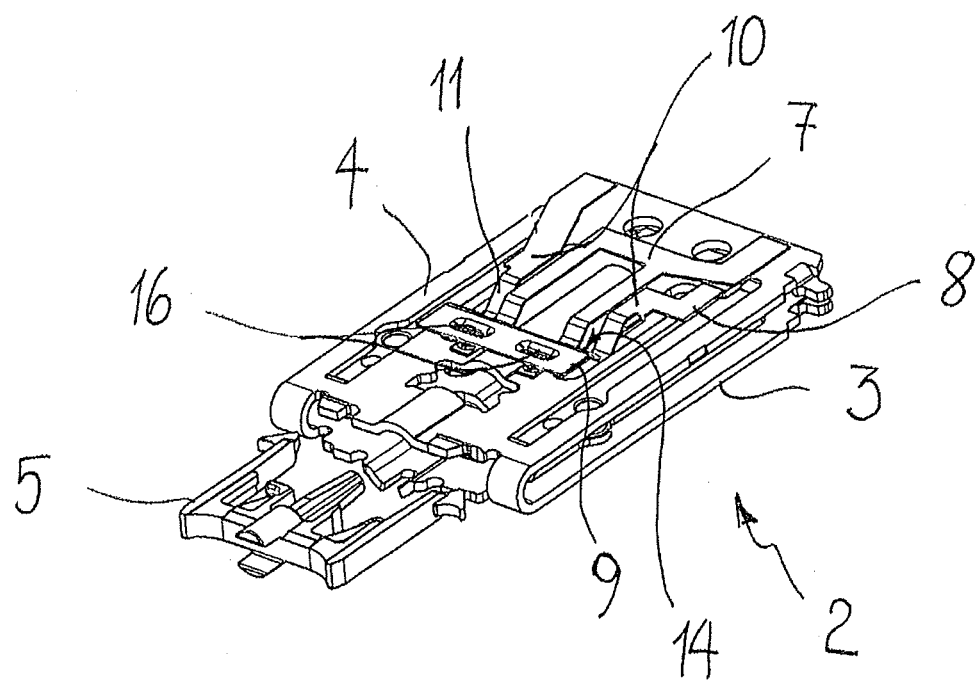
FIG. 4 shows a perspective view from below of one variant of the mechanism according to FIG. 3.

FIG. 4 shows a view from below a frame of a locking mechanism for a belt lock that in turn is provided with the reference number 2 as a whole. The flat lower part bears the reference number 4, and the flat upper part is provided with the reference number 3. The ejector 5 is shown outside of the guide channel delineated by the lower part 4 and the upper part 3. A belt tongue is inserted into the guide channel from the right in the illustrated exemplary embodiment.

According to the exemplary embodiment illustrated in FIG. 4, the switch arrangement 6 is arranged on the frame 2, for example, on the lower part 4. The fixed contact sheet bears the reference number 7, and the clamp-shaped switching contact sheet is provided with the reference number 8. The cross brace 9 with the contacts 16 connects the side braces 10. Knee-like bends 11 on the side braces 10 project through recesses 14 in the lower part 4 of the frame 2 into the axial displacement path of the ejector 5. When the ejector 5 presses against the side braces 10 of the elastic switching contact sheet 8 via the knee-like bends 11, this contact sheet is lifted off the contacts of the fixed contact sheet 7 (out of the plane of the drawing), and electrical contact is interrupted. The contact sheets can be arranged in a separate housing that covers the metallic frame of the belt lock such that the contact sheets do not come into contact with any metallic housing parts. This reliably prevents short circuits.

Figure 5:
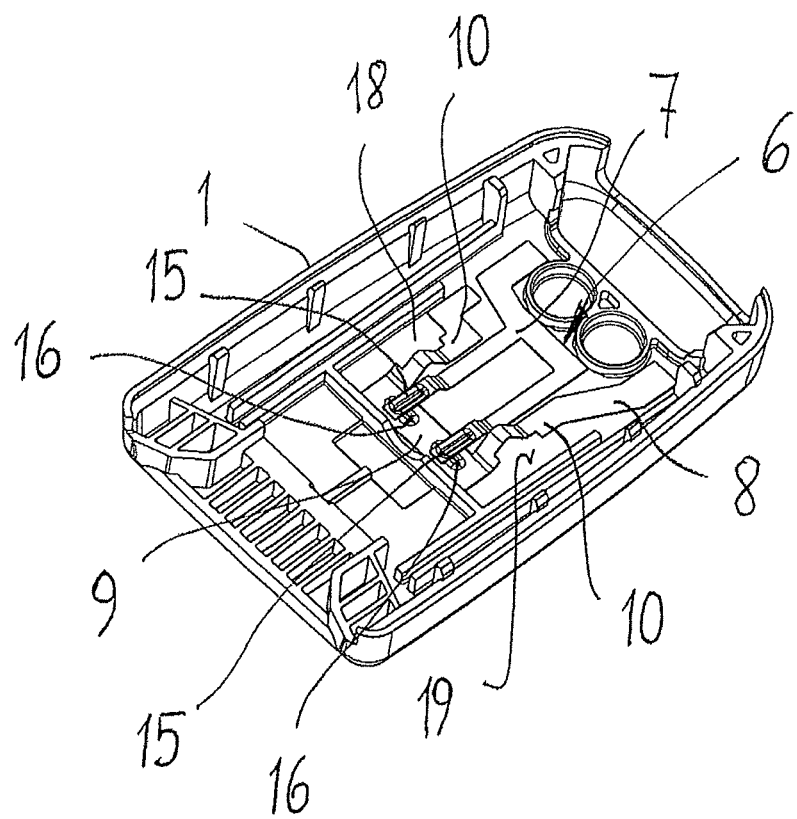
FIG. 5 shows a perspective view of a lower shell of an exemplary belt lock housing according to an embodiment of the present disclosure.

FIG. 5 shows another exemplary embodiment of the present disclosure in which the switch arrangement 6 is arranged in a housing shell, for example in the lower shell 1 of the belt lock housing. According to another exemplary embodiment, the switch arrangement could also be arranged in the upper shell of the belt lock housing. The switch arrangement 6 includes a fixed contact sheet 7 with electrical contacts 15 and a clamp-like elastic switching contact sheet 8. The clamp-like switching contact sheet 8 has a cross brace 9 with electrical contacts 16 that connects two side braces 10 to one another. The side braces 10 are each provided with knee-like bends 11 that, with the locking mechanism mounted, project through recesses in the lower part of the frame into the displacement path of a component, for example of the ejector, that can be axially moved in the locking process. In the axial displacement of the ejector, the knee-like bends interact with the latter and are mechanically exposed to pressure. The switch arrangement 6 is housed in a receiver 18 in the lower shell 1. In the illustrated exemplary embodiment, the cross brace 9 of the clamp-like elastic switching contact sheet 8 is arranged at a distance to the inside wall 19 of the lower shell 1 so that when pressure is applied to the bends, lifting of its contacts 16 off the contacts 15 of the fixed contact sheet 7 is made possible. The contact sheets make contact on their end regions facing away from the electrical contacts. For example, a litz wire can be soldered or welded on (for example, laser welding). The switch arrangement can also be housed in a separate housing so that short circuits can be avoided. There can also be guides for the contact sheets.

The information that is obtained by the integrated switch arrangement about the locking status of the belt lock can be used for, for example, a belt warning indicator by an optical and/or acoustic warning signal being produced depending on the detected locking status of the seat belt system, which provides an indication to the passenger or passengers of an automobile to fasten their seat belts. Furthermore, the belt lock that is equipped according to the disclosure can also be used for activation or deactivation of mechanisms for inflating airbags for the passengers of an automobile. If there is no passenger in the vehicle, the airbags on the passenger side can be deactivated, for example, based on the detected locking status (unlocked).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A belt lock for a seat belt system, comprising:
a belt lock housing formed from an upper housing shell and a lower housing shell;
a locking mechanism configured to be actuated and being arranged in the belt lock housing for an insertable belt tongue having an axially movable component whose location is changeable from a first end position into a second end position when the locking mechanism is actuated,
wherein the locking mechanism comprises a switch arrangement that has at least one fixed contact part and one switching contact part configured to move relative to the at least fixed contact part and on which, in an end position of the component that changes its location, the component acts,
wherein the switching contact part is arranged as a spring sheet with two axially running side braces, a cross brace, and at least two bends that, in an end position of the axially movable component, are configured to be mechanically exposed to pressure by the component,
wherein the axially movable component includes an ejector that can be moved within a frame that is delineated by a flat upper part and a flat lower part, and
the switch arrangement is integrated into the lower housing shell, the bends projecting through recesses in the lower part of the frame into a displacement path of the ejector, wherein the lower shell is equipped with a receiver for the fixed contact part and for the switching contact part.

2. The belt lock according to claim 1, comprising bends on the cross brace.

3. The belt lock according to claim 1, wherein the bends are arranged on the side braces.

4. The belt lock according to claim 1, wherein the axially movable component includes an ejector configured to be moved within a frame that is delineated by an upper part and a lower part, and
wherein the switch arrangement is arranged in the immediate vicinity of the ejector, within the frame or on the frame.

5. The belt lock according to claim 1, wherein the fixed contact part has at least two electrical contact regions that interact with the same number of switching contacts on the switching contact part.

6. The belt lock according to claim 5, wherein the switching contacts are arranged on the cross brace that connects the two side braces.

7. The belt lock according to claim 1, wherein the switch arrangement is arranged as an N/C contact.

8. A device comprising the belt lock according to claim 1 for generation of at least one of an optical and acoustic warning signal.

9. A device comprising the belt lock according to claim 1 for at least one of activation and deactivation of mechanisms for inflation of airbags in an automobile.

10. The belt lock according to claim 1, wherein the fixed contact part has at least two electrical contact regions that interact with the same number of switching contacts on the switching contact part.

11. The belt lock according to claim 10, wherein the switching contacts are arranged on the cross brace that connects the two side braces.

* * * * *